(12) United States Patent
Molins

(10) Patent No.: US 6,841,242 B2
(45) Date of Patent: Jan. 11, 2005

(54) SILICA YARN FOR TEXTILE WITH HIGH THERMAL RESISTANCE

(75) Inventor: Laurent Molins, Souppes sur Loing (FR)

(73) Assignee: Saint-Gobain Quartz S.A.S., Courbevoie (FR)

( * ) Notice: Subject to any disclaimer, the term of this patent is extended or adjusted under 35 U.S.C. 154(b) by 0 days.

(21) Appl. No.: 10/481,895

(22) PCT Filed: Jul. 3, 2002

(86) PCT No.: PCT/FR02/02315
§ 371 (c)(1),
(2), (4) Date: Jan. 5, 2004

(87) PCT Pub. No.: WO03/004739
PCT Pub. Date: Jan. 16, 2003

(65) Prior Publication Data
US 2004/0234762 A1 Nov. 25, 2004

(30) Foreign Application Priority Data
Jul. 4, 2001 (FR) .......................................... 01 08853

(51) Int. Cl.⁷ ............................ D02G 3/00; C08B 19/08
(52) U.S. Cl. .......................... 428/357; 501/54; 501/55; 501/59; 501/95.1
(58) Field of Search ............................ 428/357; 501/54, 501/55, 59, 95.1

(56) References Cited

U.S. PATENT DOCUMENTS 3,092,531 A 6/1963 Labino

FOREIGN PATENT DOCUMENTS

| EP | 0 160 232 | 11/1985 |
| EP | 0 510 653 | 10/1992 |
| FR | 1 172 142 | 2/1959 |

*Primary Examiner*—N. Edwards
(74) *Attorney, Agent, or Firm*—Oblon, Spivak, McClelland, Maier & Neustadt, P.C.

(57) ABSTRACT

The invention relates to a silica yarn and to woven or nonwoven fabrics produced from said yarn, which comprises 30 to 1500 ppm by weight of aluminum and 10 to 200 ppm by weight of titanium in oxidized form, the sum of the mass of the chemical elements different from Si and O being less than 5000 ppm by weight, the following elements being absent or present in a very small quantity: boron, sodium, calcium, potassium and lithium. The fabrics comprising this silica yarn have an excellent high-temperature withstand and thus retain their flexibility for a long time at above 600° C. They are useful especially in uses requiring good high-temperature flexibility, such as for furnace seals.

27 Claims, 1 Drawing Sheet

SILICA YARN FOR TEXTILE WITH HIGH THERMAL RESISTANCE

Figure 1:
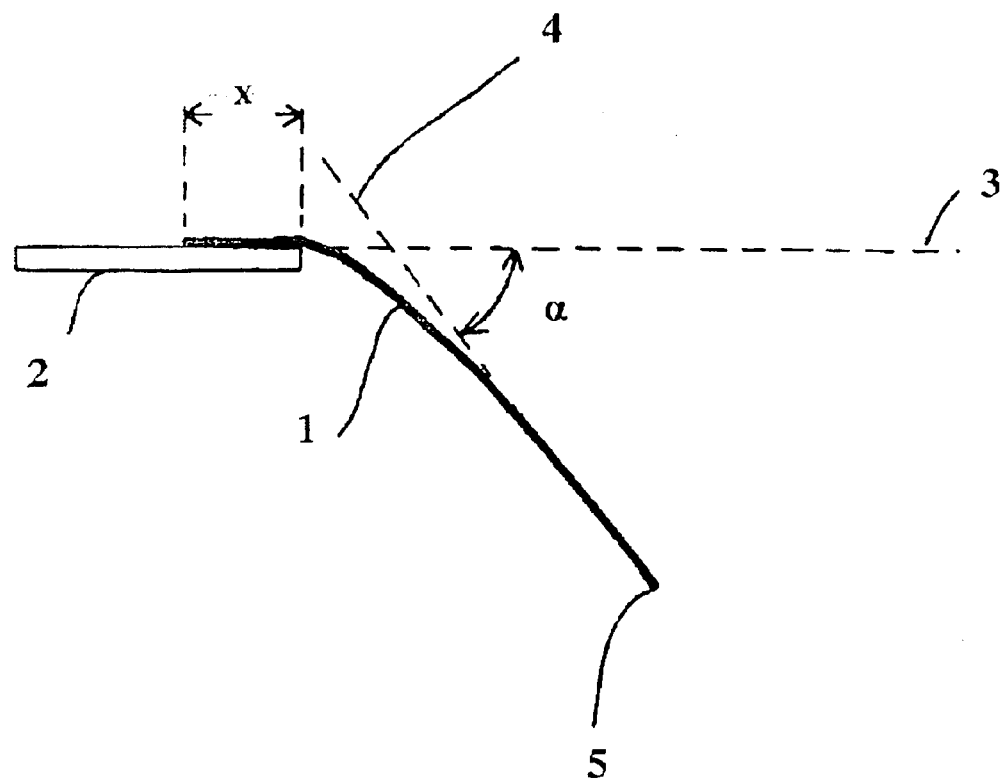

The invention relates to a silica yarn and to woven or nonwoven fabrics produced from said yarn (or "fiber"), it being possible for this yarn to be obtained by the process which consists in mechanically drawing a molten silica preform in a flame.

For high-temperature applications (furnace seals, furnace curtains, welding curtains, ablative protection, etc.), that is to say applications generally above 600° C., it is desirable for the yarns to have the best possible stability so as to allow fabrics to be made up that have good retention of their mechanical properties despite the numerous heating/cooling cycles, and especially their flexibility. This is because a fabric that stiffens when it is subjected to heating/cooling cycles becomes brittle and does not have the same lifetime as a fabric having better retention of its flexibility while it is being used.

For this type of application, it is possible to use fabrics produced from washed glass. The starting point for such a material is generally an E-glass yarn (or a yarn of suitable glass compositions that are generally very rich in silica), which is woven or braided and then made to undergo a washing operation using acids (for example sulfuric acid or nitric acid) so as to lower the impurity content of the silica. Given the very high level of impurities in the starting glass, many impurities generally still remain after the washing. The fabric thus obtained does not exhibit sufficient high-temperature stability. In addition, washing the glass leads to the formation of porosity in the silica and, before use, it is generally necessary to carry out a severe heat treatment (at around 1100° C.) so as to increase the porosity of the yarns by sintering. However, this is necessarily accompanied by an undesirable shrinkage. Moreover, the porosity of such yarns is never completely eliminated and the fabric continues to show a certain tendency to shrink during its use. Because of its porosity, the washed glass has a low density, of less than 2.15.

To try to overcome the drawbacks of washed glass, it may be attempted to use ultrapure silicas. However, the Applicant has also discovered that silicas containing a very low content of Al and of Ti have a tendency to bridge (by a mechanism similar to that of sintering phenomena). This is also detrimental to the stability of fabrics subjected to heating/cooling cycles.

As documents of the prior art, mention may be made of EP 0 510 653 (of the same family as U.S. Pat. No. 5,248,637), GB 824 972, U.S. Pat. No. 3,092,531, EP 0 160 232 (of the same family as U.S. Pat. No. 4,786,017).

The silica yarn according to the invention solves the above-mentioned problems. It has an excellent thermal withstand, that is to say it has very good stability (very low tendency to crystallize) above 600° C., or even above 700° C., for example at less than 1100° C. or even less than 1200° C. This high temperature withstand makes it possible to use articles produced from the yarn according to the invention for long periods at the abovementioned temperatures, for example for at least 100 hours, or even at least 1000 hours or even at least 10000 hours. In particular, the silica yarn according to the invention makes it possible to produce fabrics that retain excellent flexibility (i.e. high flexibility) after having been subjected to the heat treatments that have just been mentioned. During the heat treatment, the is flexibility of the fabric remains similar to that which it had before the heat treatment, and it may even increase.

The silica yarn according to the invention is especially applicable for making up fabrics such as wovens, knits, braids, nonwoven fabrics (needle-punched nonwovens, felts, fleeces, etc). The abovementioned articles may be used without a matrix between the yarns (in the case of wovens, these are then referred to as dry wovens) such as for furnace seals or furnace curtains. The formation of a ceramic matrix, for example using CVI (chemical vapor infiltration) techniques is not, however, excluded.

The invention relates more particularly to wovens from 300 g/m$^2$ to 1500 g/m$^2$ (generally about 600 g/m$^2$ and about 1200 g/m$^2$) with weaves of the plain, twill or 8$h$ satin or 12$h$ satin type (AFNOR XP B38-210 to XP B38-253 standards). The invention also relates to felts and webs whose density varies from 4 to 35 kg per m$^3$ and to needle-punched fabrics whose density varies from 90 to 200 kg per m$^3$.

The silica yarn according to the invention contains very predominantly silica. In this kind of highly silica-rich composition, it is common practice:

1. to mention the amount of impurity rather than the silica content;
2. to characterize the amounts of impurity by giving the contents of the chemical elements and not the contents of oxides (contrary to what is practised in the field of glasses very much less rich in silica).

The present application will conform to this common practice, giving for example the content of the chemical element Al, whereas in the glass field the content of $Al_2O_3$ would have been given. In the silica yarn according to the invention, the amount of impurity is at most 5000 ppm by weight. The term "impurity" is understood to mean any chemical element different from Si and 0. This means that if the silica yarn according to the invention contains, for example, the chemical element Al, the latter necessarily being present in oxidized form, the Al atoms are regarded as impurities but the oxygen atoms linked to the Al atoms are not impurities. The impurity contents can be determined conventionally by atomic absorption spectroscopy through the measurement of a wavelength in a flame.

Aluminum and titanium, both in oxidized form, are present in the silica yarn according to the invention.

Alkali metals especially soda, $Na_2O$, and potash, $K_2O$, may be introduced into the compositions of the silica yarn according to the invention in order to limit the phenomena of surface diffusion of alkali metals and thus limit the sensitivity of the silica yarn to the phenomena of sintering and bridging of the filaments between them when they are exposed to high temperatures. The composition may contain only a single alkali metal oxide (from among $Na_2O$, $K_2O$ and $Li_2O$) or may contain a combination of at least two alkali metal oxides.

Boron, is known in glass media as having a devitrification-retarding action, may be present in oxidized form.

The silica yarns according to the invention are obtained from a silica-based composition comprising the following elements in oxidized form:

| | |
|---|---|
| aluminum: | 30 to 1500 ppm by weight; |
| titanium: | 10 to 2000 ppm by weight and preferably from 10 to less than 200 ppm by weight. |

In addition, the composition of the yarn is such that the following chemical elements are absent or present in oxidized form at most as follows:

| | |
|---|---|
| boron: | less than 600 ppm by weight; |
| sodium: | less than 100 ppm by weight; |
| calcium: | less than 100 ppm by weight; |
| potassium: | less than 100 ppm by weight; |
| lithium: | less than 100 ppm by weight. |

In addition, the composition of the silica yarn according to the invention is such that the measured quantities in ppm by weight of the elements Al, K, Li and Na (represented as ppm Al, ppm K, ppm Li and ppm Na respectively) fulfil the following condition: ppm Al>ppm K+ ppm Li+ ppm Na. In the silica fiber according to the invention, the mass of the element Al is therefore preferably greater than the sum of the mass of the elements K, Li and Na. More preferably, the mass of the element Al is greater than twice the sum of the mass of the elements K, Li and Na.

Moreover, preferably, any element different from Si, O. Al, Ti, B, Na, Ca, K and Li optionally present in the silica yarn according to the invention is present at less than 100 ppm by weight. Even more preferably, the sum of the masses of all the elements different from Si, O, Al, Ti, B, Na, Ca, K and Li is less than 100 ppm by weight.

Preferably, the silica yarn according to the invention is such that the Al content is greater than 80 ppm by weight.

Preferably, the silica yarn according to the invention is such that the Al content is less than 400 ppm by weight.

Preferably, the silica yarn according to the invention is such that the Ti content is less than 30 ppm by weight.

Preferably, the silica yarn according to the invention is such that the Ti content is less than 200 ppm by weight.

Preferably, the silica yarn according to the invention is such that:
the B content is less than 3 ppm by weight;
the Na content is less than 50 ppm by weight;
the Ca content is less than 60 ppm by weight;
the K content is less than 80 ppm by weight; and
the Li content is less than 10 ppm by weight.

In particular, a preferred silica composition is such that:
the Al content is between 30 and 400 ppm by weight and even more preferably between 80 and 400 ppm by weight;
the Ti content is between 10 and 200 ppm by weight and even more preferably between 30 and 200 ppm by weight;
the B content is less than 3 ppm by weight;
the Na content is less than 50 ppm by weight;
the Ca content is less than 60 ppm by weight;
the K content is less than 80 ppm by weight; and
the Li content is less than 10 ppm by weight;
and is such that the sum of the masses of all the elements different from Si, O, Al, Ti, B, Na, Ca, K and Li is less than 100 ppm by weight.

For example, a silica composition particularly suitable for the invention is such that:
the Al content is equal to about 250 ppm by weight;
the Ti content is equal to about 100 ppm by weight;
the B content is equal to about 1 ppm by weight;
the Na content is equal to about 20 ppm by weight;
the Ca content is equal to about 35 ppm by weight;
the K content is equal to about 50 ppm by weight;
the Li content is equal to about 5 ppm by weight;
the sum of all the elements different from Si, 0, Al, Ti, B, Na, Ca, K and Li being less than 100 ppm by weight.

The compositions of the silica yarn according to the invention undergo appreciably more moderate devitrification than compositions of neighboring fields.

The silica yarn according to the invention may be produced by fiberizing to a satisfactory yield under industrial operating conditions. The yarn according to the invention may thus be fiberized, like molten silica yarns or silica yarns obtained by sol-gel processes.

The yarns obtained are in the form of continuous yarns whose diameter may generally range from 5 to 300 microns, more generally from 6 to 60 μm and even more generally from 6 to 15 μm.

A spinning process that can be used within the context of the present invention is advantageously the process used conventionally by a person skilled in the art knowledgeable in silica spinning. According to this process, silica preforms of generally cylindrical cross section, the diameter generally ranging from 3 to 7 mm (more generally having a diameter of about 5 mm) are advanced into a flame capable of raising the composition to between 1800 and 2400° C., and the silica yarn is drawn within the flame. In this case, the preform has the desired composition for the yarn at the start. The silica feeding the process is generally obtained from substances (or products or components or materials) that are possibly pure (coming for example from the chemical industry) but usually natural, the latter substances often including impurities in trace amounts, these raw materials (pure or natural) being mixed, in proportions suitable for obtaining the desired composition, and then being melted. The temperature of the molten silica (and therefore its viscosity) is conventionally set by the operator so as to allow fiberizing and so as to obtain the best possible fiber quality. The fiberizing cone must be sufficiently stable. At said cone, the material must be sufficiently viscous to be spinnable, but sufficiently fluid to limit the risks of yarn breakage. The temperature of the composition is consequently set by varying the energy and temperature of the flame. It is also possible to vary the tensile force exerted downstream of the fiberizing unit and therefore to vary the speed of the latter. Before they are gathered together in!the form of yarns, the filaments are generally twisted with a sizing composition (conventionally chosen according in particular to the use of the yarns) allowing them to be protected from abrasion and making it easier for them to handled and converted into a fabric material, while limiting the risks of breakage. Preferably, the sizing composition contains the least possible amount of alkali and alkaline-earth metal chemical elements, that is to say the sum of the mass of Na, K, Li and Ca represents less than 100 ppm by weight and even more preferably less than 10 ppm by weight of the sizing composition. The silica yarn according to the invention may be spun by this process with a speed ranging, for example, from 10 to 300 km/hour. The silica yarn obtained by this process, which does not involve washing with acids, has a high density, of greater than 2.15 and generally ranging from 2.15 to 2.21, and as a result has a very low tendency toward shrinkage, which may be less than 0.5%, when it is heated to high temperature.

It is also possible to use the washed glass technique, by starting with a glass or a silica having a much higher amount of impurities than in the case of the previous process. In the case of a glass, the usual technique of spinning glass may be used, by means of bushings heated by resistance heating.

After spinning, the yarns are preferably sized (for example conventionally) and then converted into a fabric and then washed with acids so as to end up with the desired impurity contents. In this case, the washing generally results in the sizing composition being removed, which is not a problem at this stage since the yarns have already been converted into a fabric. In this case, it is therefore possible to use a sizing composition having a higher alkali and alkaline-earth metal content than for the previous process. In the case of this process, the yarn, while having the excellent stability associated with its composition, may also have the drawbacks that stem from its residual porosity.

FIG. 1 illustrates one of the principles involved in measuring the high-temperature withstand of wovens for the examples that follow. For this test, the woven (1), after heat treatment, is bonded to a steel plate (2) over a length x. The angle α, made between the tangent (4) to the fabric passing through the end (5) not on the steel plate and the horizontal (3), is then measured.

EXAMPLES 1 to 6

Silica compositions whose characteristics are given in Table 1 below are compared.

TABLE 1

| Ex. No. | ppm by weight | | | | | | | Density |
|---|---|---|---|---|---|---|---|---|
|  | Al | Ti | B | Na | Ca | K | Li |  |
| 1 | 240 | 85 | 0.8 | 19 | 34 | 60 | 1.7 | 2.18 |
| 2 | 180 | 120 | 0.8 | 21 | 14 | 40 | 7 | 2.18 |
| 3 (comp) | 18 | <1 | <1 | 0.8 | 2 | 0.6 | 0.7 | 2.2 |
| 4 (comp) | 635 | 90 | 3.4 | 560 | 71 | 6 | 0.03 | 2.1 |
| 5 (comp) | 1540 | 2600 | 660 | 6.4 | 606 | 3 | 0.3 | 2.05 |
| 6 (comp) | 40000 | 3400 | 160 | 1738 | 7850 | 6 | 2 | 2.05 |

The silica of example 4 was a silica of the sol-gel type with the brand name ENKA SILICA sold by Enka. The silica of example 3 was a silica of the brand name QUARTZEL sold by Saint-Gobain Quartz S.A. The washed glass silica of example 5 was of the brand name REFRASIL and was sold by Hitco. The washed glass silica of example 6 was of the brand name SILTEMP and sold by Ametek. The compositions of the silicas of examples 1 and 2 were prepared by melting using natural silicas or silicas obtained from pegmatite. Yarns were produced by the conventional silica yarn spinning technique. These yarns were then conventionally sized. For all the examples, the yarns had a diameter of between 5 and 14 μm. 600 g/m² glass yarn 8$h$ satins were produced from the yarns. The high-temperature withstand of the wovens was tested by the ASTM 1388 test after exposure to 1000° C. Table 2 gives the flexural rigidity values G in mg.cm, G being obtained by the formula $G = M \cdot C^3$ in which M represents the mass per unit area in mg/cm² of the woven and C represents the "bending" length in cm, these values being obtained after 10, 100 and 1000 hours in air at 1000° C., together with the value before heat treatment (duration= 0). The higher the value, the more rigid the fabric. As it is desired for the fabrics to retain good flexibility (the inverse of rigidity) during the heat treatment, rigidity values close to or even slightly less than the starting values are therefore sought.

TABLE 2

|  | Duration at 1000° C. (hours) | 0 | 10 | 100 | 1000 |
|---|---|---|---|---|---|
| Example No | 1 | 2–3 | 1–2 | 1–2 | 1–2 |
|  | 2 | 2–3 | 1–2 | 1–2 | 1–2 |
|  | 3 (comp.) | 2–3 | 5 | 5 | 5 |
|  | 4 (comp) | 2–3 | 5 | 5 | 5 |
|  | 5 (comp.) | 2–3 | 1–2 | 1–2 | 4–5 |
|  | 6 (comp.) | 2–3 | 1–2 | 1–2 | 4–5 |

It may be seen that the examples according to the invention correspond to lower rigidity values, which really show that the corresponding fabrics have retained their flexibility during the heat treatment, or even that said flexibility has slightly increased over the course of this heat treatment. This is favorable. In contrast, the rigidity of the fabrics of the comparative examples increased during the heat treatment. The wovens were also tested by measuring the angle to the horizontal of a woven test piece (the principle of FIG. 1). To do this, specimens of a woven 100 mm in length by 25 mm in width were cut. These specimens were then heated to 1000° C. for 1000 hours. They were then bonded over a length of 30 mm (x=30 mm) to a steel plate and then the angle alpha made between the woven and the horizontal was measured. A higher angle value means a more flexible material. A fabric giving an angle value close to or even slightly higher than the initial value is therefore sought. The results of the angle measurements are given in table 3 below.

TABLE 3

|  | Duration at 1000° C. (hours) | 0 | 100 | 1000 |
|---|---|---|---|---|
| Example No | 1 | 60° | 70° | 65° |
|  | 2 | 60° | 70° | 65° |
|  | 3 (comp.) | 60° | 25° | 25° |
|  | 4 (comp) | 60° | 25° | 25° |
|  | 5 (comp.) | 60° | 70° | 45° |
|  | 6 (comp.) | 60° | 70° | 45° |

These results indicate that the fabrics according to the invention have retained a flexibility close to the initial value or even slightly greater than the initial value during the heat treatment, which is favorable, since the angle made between the woven and the horizontal has increased. In the case of the comparative examples, since the value of the angle has decreased this means that they have become, on the contrary, more rigid during the heat treatment.

What is claimed is:

1. A silica yarn containing aluminum and titanium in oxidized form, the sum of the mass of the chemical elements different from Si and O being less than 5000 ppm by weight, the aluminum and titanium contents being the following:
   aluminum: 30 to 1500 ppm by weight;
   titanium: from 10 to less than 200 ppm by weight;
   the following elements being absent or present in oxidized form at most as follows:
   boron: less than 600 ppm by weight;

sodium: less than 100 ppm by weight;
calcium: less than 100 ppm by weight;
potassium: less than 100 ppm by weight;
lithium: less than 100 ppm by weight.

2. The yarn as claimed claim 1, wherein the Al content is between 30 and 400 ppm by weight.

3. The yarn as claimed claim 2, wherein the Al content is between 80 and 400 ppm by weight.

4. The yarn as claimed in claim 3, wherein the Ti content is between 30 and 200 ppm by weight.

5. The yarn as claimed in claim 1, wherein the mass of the element Al is greater than the sum of the mass of the elements K, Li and Na.

6. The yarn as claimed in claim 1, wherein the mass of the element Al is greater than twice the sum of the mass of the elements K, Li and Na.

7. The yarn as claimed in claim 1, wherein any element different from Si, O, Al, Ti, B, Na, Ca, K and Li present in the silica yarn according to the invention is present at less than 100 ppm by weight.

8. The yarn as claimed in claim 1, wherein the sum of the masses of all the elements different from Si, O, Al, Ti, B, Na, Ca, K and Li is less than 100 ppm by weight.

9. The yarn as claimed in claim 1, wherein:
the B content is less than 3 ppm by weight;
the Na content is less than 50 ppm by weight;
the Ca content is less than 60 ppm by weight;
the K content is less than 80 ppm by weight; and
the Li content is less than 10 ppm by weight.

10. The yarn as claimed in claim 1, wherein the diameter ranges from 5 to 300 microns.

11. The yarn as claimed in claim 10, wherein the diameter ranges from 6 to 60 µm.

12. The yarn as claimed in claim 11, wherein the diameter ranges from 6 to 15 µm.

13. The yarn as claimed in claim 1, wherein the density ranges from 2.15 to 2.21.

14. A fabric comprising a yarn of claim 1.

15. The fabric as claimed in claim 14, wherein it is a woven or a knit or a braid or a nonwoven fabric.

16. The fabric as claimed in claim 15, wherein it is a 300 to 1500 g/m² woven.

17. The fabric as claimed in claim 1, wherein it is a furnace seal or a furnace curtain.

18. A process comprising:
heating a fabric comprising the yarn claimed in claim 1 to a temperature of 600° C. or higher.

19. The process as claimed in claim 18, wherein the fabric is in the form of a furnace seal, a furnace curtain, a welding curtain, or an ablative protectant.

20. The process as claimed in claim 18, wherein the flexural rigidity value of the fabric does not increase after heating for 100 hours at 1,000° C.

21. The process as claimed in claim 18, wherein the flexural rigidity value of the fabric does not increase after the fabric is heated for 1,000 hours at 1,000° C.

22. The process as claimed in claim 18, wherein the fabric is heated to a temperature of 700° C. or higher.

23. The process as claimed in claim 18, wherein the fabric is heated to a temperature of from 600 to 1,200° C.

24. The process as claimed in claim 18, wherein the fabric is heated to a temperature of from 600° C. to 1,100° C.

25. The fabric as claimed in claim 14, wherein the flexural rigidity value of the fabric does not increase after heating to 1,000° C. for 1,000 hours.

26. The fabric as claimed in claim 14, wherein the angle to the horizontal of a 100 mm by 25 mm piece of the fabric does not decrease after heating to 1,000° C. for 1,000 hours.

27. The fabric as claimed in claim 14, wherein the angle to the horizontal of a 100 mm by 25 mm piece of the fabric increases after heating to 1,000° C. for 1,000 hours.

* * * * *

UNITED STATES PATENT AND TRADEMARK OFFICE
CERTIFICATE OF CORRECTION

PATENT NO. : 6,841,242 B2
DATED : January 11, 2005
INVENTOR(S) : Laurent Molins

It is certified that error appears in the above-identified patent and that said Letters Patent is hereby corrected as shown below:

Column 1,
Line 63, "is" should be deleted

Column 4,
Line 48, "to" should read -- to be --

Column 5,
Line 65, "dose" should read -- close --

Signed and Sealed this

Seventh Day of June, 2005

JON W. DUDAS
*Director of the United States Patent and Trademark Office*